(12) United States Patent
Luick

(10) Patent No.: US 6,349,362 B2
(45) Date of Patent: *Feb. 19, 2002

(54) SCHEME TO PARTITION A LARGE LOOKASIDE BUFFER INTO AN L2 CACHE ARRAY

(75) Inventor: David Arnold Luick, Rochester, MN (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,794

(22) Filed: Aug. 31, 1998

(51) Int. Cl.[7] ............................. G06F 12/10; G06F 12/00
(52) U.S. Cl. ............................ 711/128; 711/122; 711/207
(58) Field of Search ................................. 711/128, 122, 711/117, 202, 205, 206, 207

(56) References Cited

U.S. PATENT DOCUMENTS

| | | | | |
|---|---|---|---|---|
| 4,905,188 A | * | 2/1990 | Chuang et al. | 711/128 |
| 5,418,922 A | * | 5/1995 | Liu | 711/3 |
| 5,946,718 A | * | 8/1999 | Green | 711/207 |
| 5,960,463 A | * | 9/1999 | Sharma et al. | 711/206 |
| 5,978,887 | * | 11/1999 | Yeager | 711/127 |

* cited by examiner

Primary Examiner—Matthew Kim
Assistant Examiner—Matthew D. Anderson
(74) Attorney, Agent, or Firm—David A. Hall; Roy W. Truelson

(57) ABSTRACT

A data cache is constructed with the same dimensions as for a conventional n-way associative cache, but is constructed as an (n−1)-way associative cache, so that one associative column of the cache is left unused, although the cache has the same memory array size as a typical n-way associative cache. The extra column of data in the cache is organized as an independent logical translation look-aside buffer (TLB) that is n-way associative. Thus, there is no separate TLB array for the cache, rather, the TLB is contained within the data cache array. In this way, the cache can be implemented with a single chip, and can be of relatively large size, on the order of 8 MB or more.

20 Claims, 7 Drawing Sheets

SCHEME TO PARTITION A LARGE LOOKASIDE BUFFER INTO AN L2 CACHE ARRAY

BACKGROUND OF THE INVENTION

1. Field of the Invention

This invention relates generally to computer temporary storage and, more particularly, to computer processor cache operations.

2. Description of the Related Art

The central processor of a computer manipulates data in main storage that is a copy of data maintained in a non-volatile storage unit, such as direct access storage devices (DASD) comprising magnetic or magneto-optical disk drive units. In manipulating data, system programmers work with "real" addresses of data in main storage that are associated with corresponding data that are cross-referenced with virtual addresses in the DASD storage. The central processor unit (CPU) is typically implemented as part of an integrated circuit processor chip, which is constructed with various registers, data lines, main memory, and associated electronic components that are incorporated into a single package for mounting to a circuit board or module.

Data values with real addresses in main memory volatile storage must be. synchronized, or cross-referenced, with the virtual addresses of the DASD storage. Such cross-referencing is generally accomplished with a Page Frame Table (PFT) kept in the main memory. The PFT is organized with a real address (RA) column and a virtual address (VA) column. In each row of the PFT, an entry in the RA data column cross-references main memory data to a DASD data location specified by the entry in the VA data column. With a load reference to an RA and the PFT, the VA of the data in the DASD can be found. In this way, data can be retrieved and stored between the main storage and the DASD storage. A typical size for main storage is 1 to 16 gigabytes (GB) of memory. Data pages of 4K bytes are cycled into main storage with each DASD data operation, so that each entry in the PFT references a 4K page of data (unless otherwise specified, references to size of data storage will be understood to be made with reference to bytes of data).

The main storage in a computer typically has an access cycle time of approximately 500 processor cycles, so going to the PFT to retrieve and store data 4K at a time delays the data operations, and is a waste of processor resources and is inefficient. It is anticipated that processors will soon have a cycle time of only 1 nanosecond (ns) or less for execution of instructions. Even at this speed, waiting 500 processor cycles (500 ns) to retrieve a page of data still wastes processor resources and is inefficient.

Cache storage is used to temporarily store smaller blocks of data and can be more quickly accessed than main memory. Data can be stored and retrieved in cache memory rather than going to the main memory storage for each data reference. Thus, cache can speed up processing. Cache on the same chip as the processor can be accessed within a few processor cycles, but is limited in size, because of fabrication and cost constraints. While the PFT may contain 1M of entries, a cache is more expensive to implement than main storage, and therefore has a reduced number of entries as compared with the PFT. Therefore, it is conventional to use multiple levels of cache, on multiple chips. Cache references are generally to 4K pages of data.

A cache directory indicates whether the data identified by an RA is stored in the cache, which is generally regarded as part of main memory. Thus, a processor instruction that references an RA can be provided to the cache. If the RA is in the cache directory, then the processor knows it can get the referenced data from the main memory cache storage rather than from the DASD. If the RA is not in the cache directory, a condition called a cache miss, then the processor must check with the PFT to find the VA of the data and then, using the VA, obtain the data from the DASD. Thus, data references must proceed through a translation process that checks the referenced RA to find if it is located in the cache directory, and to retrieve the data from DASD (via the PFT) if it is not in main storage. Similarly, a store reference to an RA must proceed through a translation process to ensure storage at the proper DASD location.

It is preferable to implement a cache on the same chip as a processor, and cache storage typically includes a cache directory of contents, a data cache with the actual data values, and a corresponding address cache of RA and VA information. The cache operates under control of a cache controller. The address cache is typically referred to as a translation look-aside buffer (TLB), because it stores addresses and translates between RA and VA information. To accommodate a large number of addresses in the limited width of the processor data bus, it is typical to index the RA space in the cache with only the low-order bits of an address. For example, if four bits are used to index the cache, an RA can reference a cache with sixteen rows of data, entries whose low order bits are numbered from zero to fifteen. These sixteen rows of RA can be viewed as a first column of the cache TLB. To reference more than sixteen entries, the cache must contain additional columns.

If an entry in the four-bit indexed cache has an RA ending in '0101', for example, and if a second entry is received also with an RA ending in '0101', then a second column of cache TLB will be needed to properly enter the additional data value in the cache. The cache directory will still be sixteen bits (16 rows), but the TLB will comprise two columns, each of sixteen rows. It should be apparent that a relatively large TLB might be necessary to ensure that the real address of the requested data can be generated by the TLB without going to the PFT. In the example, the TLB entry must identify which of the two cache directory columns correspond to the requested data value, but the cache directory will still reference only the four low-order bits, in accordance with the cache directory indexing scheme. That is, the TLB must be sufficiently wide (for example, 16 bits wide) to identify the RA of the cache entry, whereas the cache directory need be only as wide as the number of low-order bits used to index the cache (that is, wide enough to address one column, or four bits in the example).

The additional columns of data cache are referred to as levels of associativity. It has been found to be most efficient if a TLB is constructed as a two-way or four-way associative table (that is, two or four columns of TLB are used to contain the address of the corresponding PFT address entries). A four-way TLB, for example, will be approximately one-fourth the size of the corresponding PFT.

In a conventional processor, it is known to include a second-level cache with a TLB and a corresponding data cache, referred to as L2 TLB and L2 data cache, respectively, for increased data efficiency. The L2 cache may not be on the same chip as the processor and L1 cache. If a miss in the first-level (L1) cache occurs, the address is provided to the L2 TLB and checked against L2 cache. The L2 cache has been found useful because access operations and TLB access operations need to be performed in approximately the same time, and a typical miss rate for L1 cache is 3%. If there is only L1 cache, then each cache miss results in a PFT operation, which requires a wait of 500 processor cycles. The resulting wait time of 500 ns with each L1 miss is too great a penalty with a 3% L1 miss rate.

The L2 cache provides a larger data space than the L1 cache, but is sufficiently small to provide relatively fast access times (on the order of 3 processor cycles). A typical size for a large L2 data cache currently is 4M to 8M of data. The miss rate for the L2 cache is usually on the order of 0.1%. It may be desirable to include yet another cache, a level-three (L3) cache and corresponding L3 TLB. The L3 cache typically would be larger than the L2 cache, on the order of 128M of data (64K rows, referencing 4K pages). The L3 cache, however, probably could not fit on the same chip with the processor and the L1 cache, along with the L2 cache. This limits the data transfer speed, because the on-chip 128-bit bus would not be available for L3 cache transfers, and the 32-bit general system, off-chip data bus must be used.

In operation with L1, L2, and L3 cache, an L1 miss would result in a reference to the L2 TLB to check for the requested data in the L2 TLB. An L2 miss would result in referencing the L3 TLB. At any time, an RA hit in TLB results in retrieving the data page from the corresponding data cache. When the last level of cache has been checked and the data RA has resulted in a miss, it becomes necessary to go to the PFT, determine the virtual address in DASD, and then retrieve the missed data from DASD and place it into the main storage, as well as in all levels of cache.

It is advantageous to include as much cache as possible on the same chip as the processor. Such same-chip construction minimizes wire delay that otherwise would be suffered in moving data from off-chip cache to the processor and its memory, and avoids data transfer delays incurred due to the limited number of data pins available, which thereby limits the width of the chip-to-chip data bus. Given the typical two-way or four-way construction of cache TLB, it should be apparent that a relatively large TLB array may be necessary for typical L2 (or higher level) cache. For example, an L2 cache that contains 8M of data might require an L2 TLB with 16K of entries, being 16-way associative. Such a cache might be constructed using an array of four 8M memory chips. Such dimensions, however, may not easily be accommodated on a single processor chip with a processor, cache TLB, cache directory, and data cache.

From the discussion above, it should be apparent that there is a need for a data cache that can contain a relatively large number of entries, without requiring large arrays and data interfaces that prevent a single, on-chip implementation. The present invention fulfills this need.

SUMMARY OF THE INVENTION

The present invention provides a cache for temporary storage of data, wherein the data cache is constructed with the same dimensions as for a standard n-way associative cache, but is constructed as an (n−1)-way associative cache, so that one associative column of the cache is left unused, although the cache has the same memory array size as a typical n-way associative cache. The extra column of data in the cache is organized as an independent logical translation look-aside buffer (TLB) that is n-way associative. Thus, there is no separate TLB array for the cache, rather, the TLB is contained within the data cache array. In this way, the cache can be implemented with a single chip, and can be of relatively large size, on the order of 8 MB or more.

In one aspect of the invention, for the (n−1)-way associative data cache, a real address (RA) with an n-bit all-ones value is interpreted as a TLB reference rather than as a data reference. That is, a reference to the last column is used to place the cache array chip into a TLB mode in which the otherwise unused nth column is referenced as a TLB. Preferably, the cache is virtually indexed (rather than real address indexed) and the TLB is referenced only when there is a cache miss. Because the cache can be made relatively large, cache misses will occur less frequently than typical. This provides improved operating speed and improved utilization of chip resources.

Other features and advantages of the present invention should be apparent from the following description of the preferred embodiment, which illustrates, by way of example, the principles of the invention

DESCRIPTION OF THE PREFERRED EMBODIMENT

Figure 1:
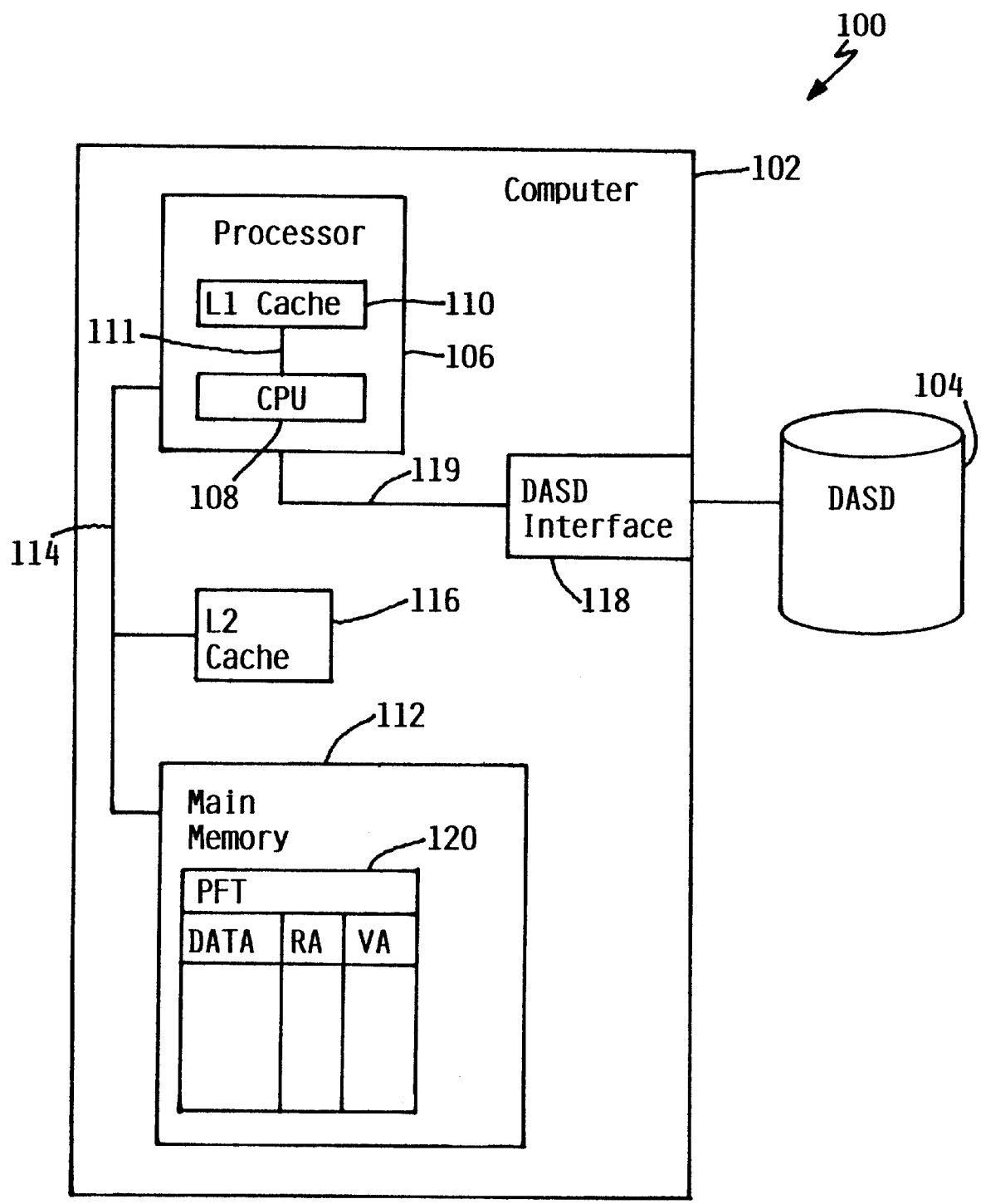
FIG. 1 is a block diagram of a computing system having a cache constructed in accordance with the present invention.

FIG. 1 is a block diagram of a computing system 100 constructed in accordance with the present invention. The computing system includes a computer 102 connected to a direct access storage device (DASD) 104 that provides non-volatile data storage. The DASD may comprise, for example, a magnetic disk drive or a magneto-optical disk drive. The computer includes a processor 106 having a central processing unit (CPU) 108 and a first-level (L1) cache 110. The CPU communicates with the L1 cache over a 128-byte data bus 111 internal to the processor 106. The processor 106 communicates with main memory 112 over a 128-byte data bus 114. The computer 102 also includes a second-level (L2) cache 116. In accordance with the invention, the L2 cache is constructed with the same storage array dimensions as for a conventional 16-way associative cache, but is organized as a 15-way associative cache, with one column of the cache unused for data storage. Thus, although the L2 cache is constructed with the same array size as a typical 16-way associative cache, the extra column of storage array that would otherwise have been used for data is instead organized as an independent logical translation look-aside buffer (TLB) that is 16-way associative. The TLB of the L2 cache 116 is referenced only when there is a cache miss. In this way, the L2 cache can be implemented with a single chip, and is of relatively large size. In the preferred embodiment, the L2 cache may be on the order of 8M or more.

In the computer 102, the processor 106 communicates with the DASD 104 through a DASD interface 118 that communicates over a 32-byte system data bus 119. In accordance with typical computer construction, the main memory 112 includes a page frame table (PFT) 120 that stores real addresses (RA) of data stored in the main memory and stores virtual addresses (VA) of corresponding locations in the DASD where the data is stored.

Figure 2:
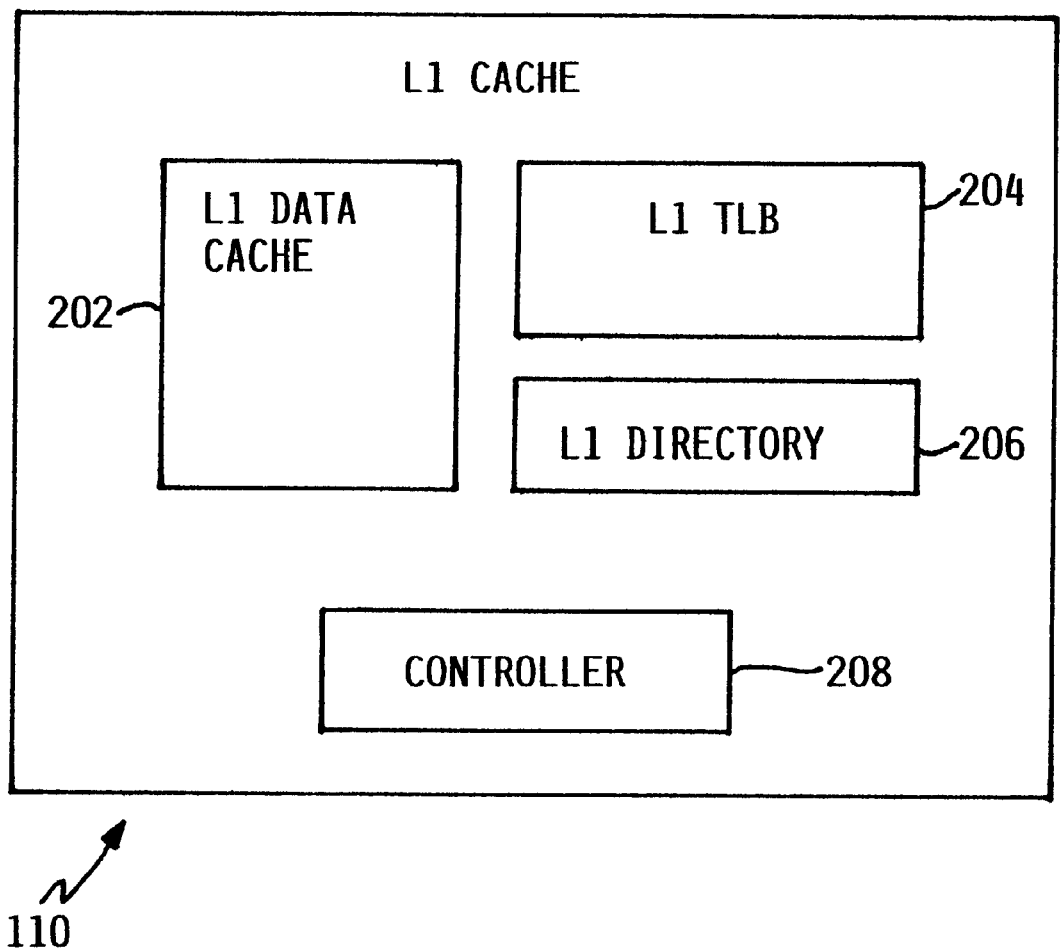
FIG. 2 is a block diagram of the L1 cache illustrated in FIG. 1.

FIG. 2 is a block diagram that shows details of the L1 cache 110 illustrated in FIG. 1. The L1 cache 110 is constructed in a single-chip configuration with the CPU 108, so that both are on the same integrated circuit chip and comprise the single-chip processor 106 illustrated in FIG. 1. Details of the L1 cache 110 are shown in FIG. 2, which shows that the L1 cache 110 includes storage arrays comprising an L1 data cache 202, an L1 translation look-aside buffer (TLB) 204, and an L1 cache directory 206. Control circuitry that interfaces the L1 cache with the CPU 108 (FIG. 1) is indicated in FIG. 2 by the cache controller 208. The L1 data cache 202, L1 TLB 204, and L1 directory 206 are constructed from conventional memory arrays, such as are readily available in configurations of, for example, 4M or 8M chip arrays.

In the preferred embodiment, the CPU 108 (FIG. 1) processes data references (machine instructions to load, branch, and store) to ensure that no page fault will be associated with the machine instruction. This is important for efficient operation, as operating systems typically process page faults with interrupt processing that is disruptive and wastes operation time. Thus, the CPU processes data references by first checking the L1 cache 110. The data references must go through a data translation process to determine if the subject data is located in the main memory storage and to determine the real address of the data.

A cache hit occurs when the real address (RA) of the data item is contained within the L1 cache, which means that the data item is present in the main memory storage. The CPU therefore can get the referenced data item from the main storage 112 rather than going to the DASD 104, after first checking the PFT 120 for the DASD data location by looking in the L1 TLB 204. In this way, the TLB functions as a cache for the PFT. If the cache line RA is not in the L1 cache 110, a cache miss, then the CPU checks with the L2 cache 116 for the data item. If there is an L2 cache miss, then the CPU must go to the main store for the page with the data item, as long as there was a TLB hit. That is, there is no need to go to DASD for the data, because the successful translation process (TLB hit) has already retrieved the RA that will retrieve the data from the RA-indexed cache. If there is an L2 cache hit, then the CPU has located the data.

Figure 3:
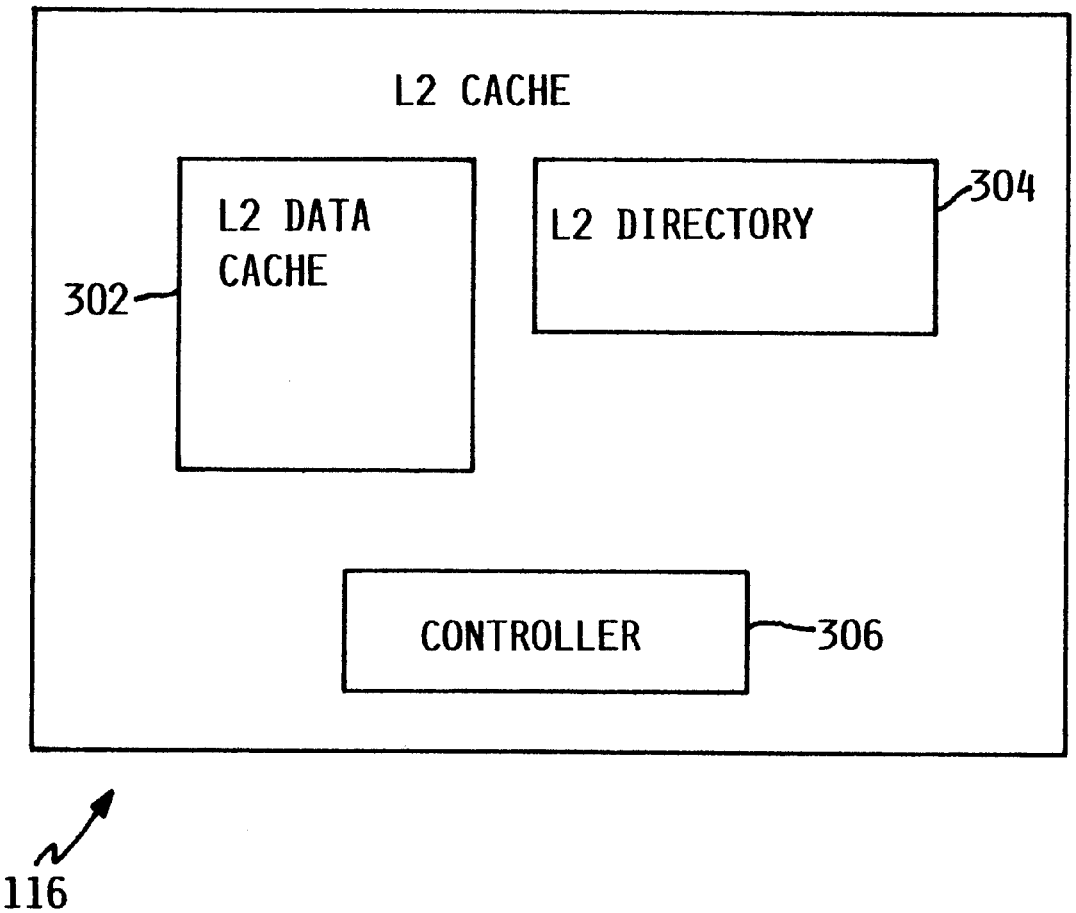
FIG. 3 is a block diagram of the L2 cache illustrated in FIG. 1.

FIG. 3 is a block diagram that shows the L2 cache 116 (FIG. 1) in greater detail. In particular, FIG. 3 shows that the L2 cache 116 includes an L2 data cache 302 and an L2 cache directory 304. The data cache and cache directory are each constructed of one or more storage memory arrays. The arrays may comprise, for example, conventional 4M or 8M memory arrays. Control circuitry that interfaces the L2 cache with the CPU 108 (FIG. 1), and which ensures operation in accordance with the invention, is indicated in FIG. 3 by the cache controller 306. Thus, the L2 cache 116 does not have a separate translation look-aside buffer (TLB). Rather, in accordance with the present invention, the L2 cache TLB is contained within the L2 data cache 302 itself. The L2 data cache 302 and L2 directory 304 are constructed from conventional storage arrays, such as are readily available in configurations of, for example, 2M and 4M denominations. The details of such a construction will be explained with reference to FIG. 4.

Figure 4:
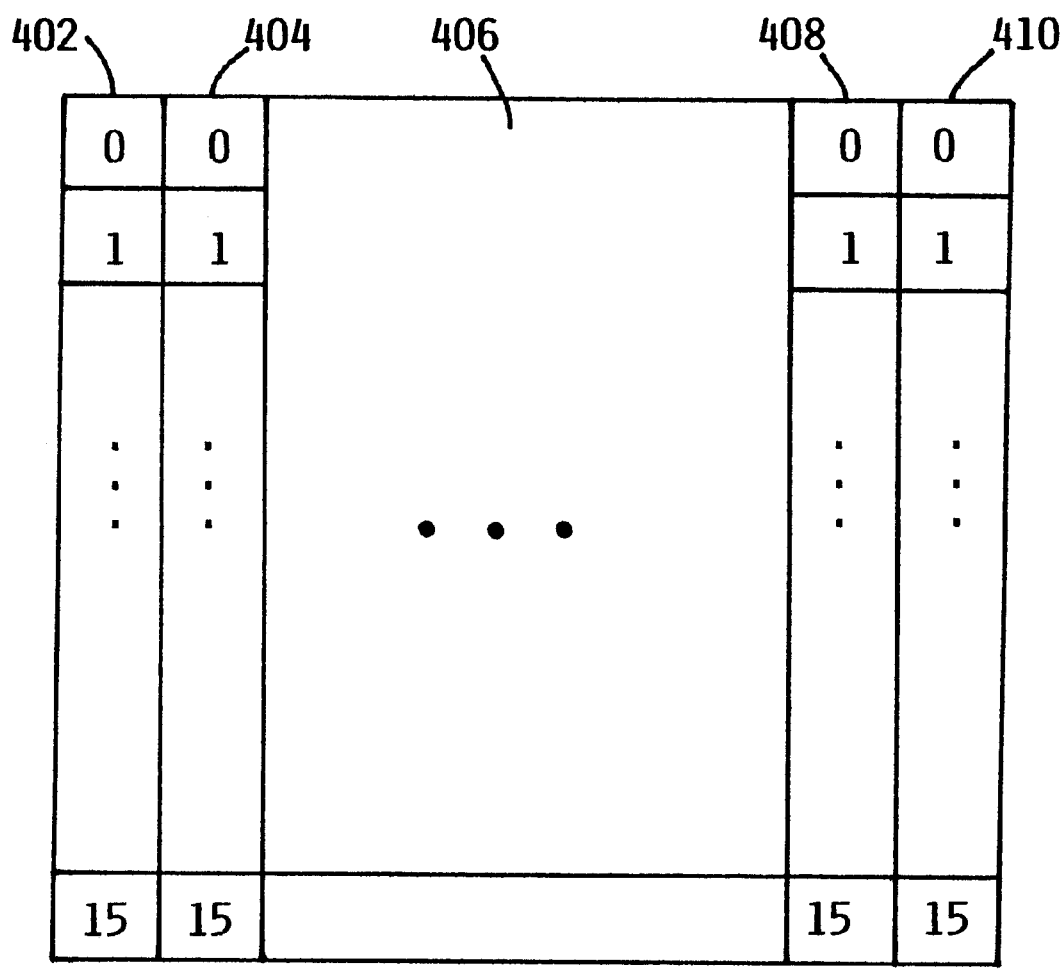
FIG. 4 is a graphical representation of the L2 cache illustrated in FIG. 3.

FIG. 4 is a representation of the L2 data cache 302. The L2 cache is organized as a 15-way associative cache, but is constructed with array dimensions suitable for a 16-way associative cache. That is, the L2 cache is constructed using multiple memory chips to form a data array having dimensions for a 16-way associative cache. Therefore, the L2 data cache 302 has sixteen columns. This is indicated in the FIG. 4 representation by illustrating the first column 402, the second column 404, third through fourteenth columns 406, the fifteenth column 408, and the last, sixteenth column 410. In the preferred embodiment, the L2 cache 302 is constructed with memory modules such that it has an array size of 8 MB, with the same array size as would be dictated by an 8 MB, 16-way cache. It should be understood that other module configurations and array sizes may be used without departing from the teachings of the invention.

Each column of the L2 data cache 302 is shown in FIG. 4 with sixteen rows, represented by the "0" row, "1" row, through the "15" row shown in the illustration. Thus, the L2 data cache is referenced with four bits to address one of the sixteen rows. It should be understood that each row and column entry of the data cache 302 corresponds to a data value specified by the appropriate address, which determines the row of the cache, and by the TLB, which determines the column of the cache. That is, the last column 410 of the L2 data cache 302 is used not as the sixteenth column of a 16-way associative data cache, but as a TLB for the corresponding 15-way associative cache. Thus, the last column 410 is a TLB for the first fourteen columns 402, 404, . . . , 408. With the last column 410 of the array 302 unused for data, one-sixteenth of the array (512 KB of memory) becomes available. In accordance with the invention, this 512 KB extent of memory is organized as an independent logical translation look-aside buffer (TLB), whose organization is shown in greater detail in FIG. 5.

Figure 5:
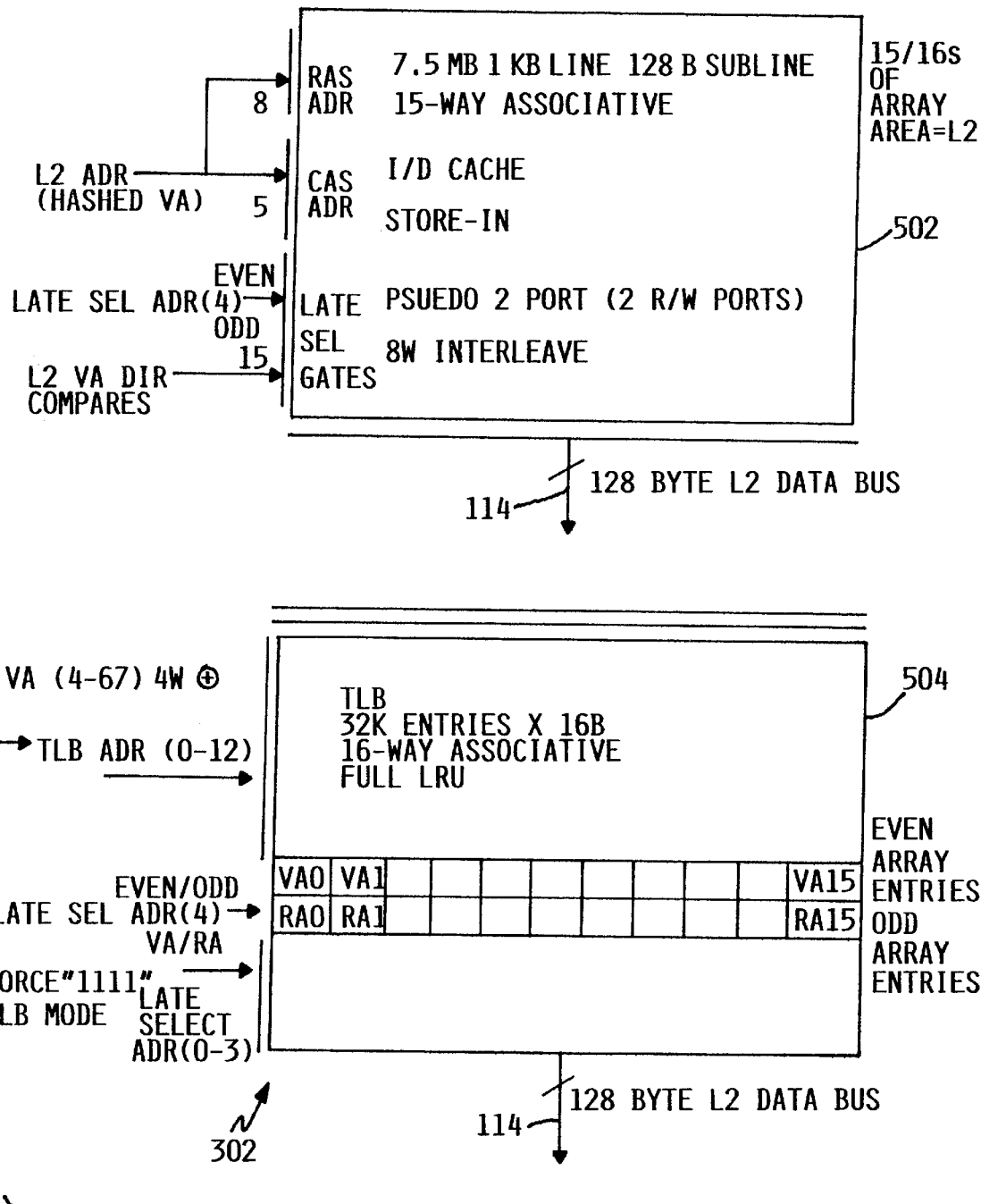
FIG. 5 is a diagram showing the respective organization of the data area and the TLB area of the L2 data cache illustrated in FIG. 3.

FIG. 5 shows the L2 data cache 302 in two portions, for purposes of illustration. The top portion of FIG. 5 shows the organization of the data cache area 502, which occupies 15/16 of the memory array from which the L2 cache is constructed (that is, approximately 7.5 MB). The bottom portion of FIG. 5 shows the organization of the L2 cache TLB area 504, which occupies 1/16 of the memory array area, or 512 KB.

The FIG. 5 illustration of the L2 cache TLB area 504 shows that the L2 TLB is organized as a 512 KB array, having 32K entries of 16 bytes each, in a 16-way associative manner. Entries are maintained in a standard least-recently-used (LRU) configuration that is well-known to those skilled in the art. FIG. 5 shows that the same 128-byte cache bus 114 (also indicated in FIG. 1) that is available to the L2 data cache 502 is also available to the L2 TLB area 504.

Each associative set of the L2 cache TLB 504 comprises two rows of the array, each row having a total of 128-bytes with sixteen 8-byte entries. The first row of each associative set contains sixteen 8-byte virtual addresses (shown as VA0, VA1, . . . , VA15 in FIG. 5), and the second row of each associative set contains sixteen 6-byte real addresses, along with a one-byte flag field and a one-byte LRU field for each set, making up sixteen 8-byte fields (shown as RA0, RA1, . . . , RA15 in FIG. 5). This is shown in greater detail in FIG. 6, which is described further below.

In FIG. 5, the L2 data cache portion 502 is illustrated as 15-way associative, and the last four bits of a received entry are used for set selection following L2 directory comparison. If the last four bits comprise a "1111" pattern, this indicates a 16th-set selection, which is not a valid address for the illustrated 15-way associative array. Therefore, when the "1111" occurs, the L2 cache controller 306 (FIG. 3) automatically operates in a TLB mode, and references the otherwise unused one-sixteenth of the memory array 504 allotted for the L2 TLB function.

The L2 cache 302 is arranged with virtual indexing, and therefore the only time the L2 cache TLB needs to be referenced is when there is an L2 cache miss or a reference to a data item not in the main store and not in the L2 cache. Typically, access to the L2 array occurs within three CPU cycles, with a streaming mode of sequential locations needed for each extra cycle associated with a TLB reference. Thus, in four CPU cycles the entire sixteen-set associative entries per association class can be fetched into the SCU and the appropriate real address selected. In general, as a consequence of the combined data cache and TLB described, four cycles will be added to main store accesses. Nevertheless, because the L2 cache is relatively large, the miss rate for L2 cache typically is on the order of 0.4 percent miss per reference. Thus, very little access time penalty is associated with the novel arrangement of the present invention. Moreover, memory fetch requires, in general, on the order of 40 to 80 CPU cycles to execute, so the additional access time is relatively small.

In practice, the miss rate for the L2 cache 116 (FIG. 1) is approximately 0.05 percent miss per reference, which miss would have caused a second (or even third) access to the page frame table. This is due to the fact that the TLB maps data space equal to sixteen times the size of the L2 data cache, with twice the associativity of the L2 cache, and prefetches eight PTEs per miss. Thus, a single, relatively large TLB constructed as described can have a relatively small-system overhead, on the order of 1 percent or less, but yet still allowing a relatively slow four-cycle access of the memory array, and without requiring a smaller and faster prefetch lookaside buffer (PLB). A one-cycle PLB is unlikely to be of any value in the configuration described, given a virtually indexed L2 cache of 2 MB to 16 MB in size.

Figure 6:
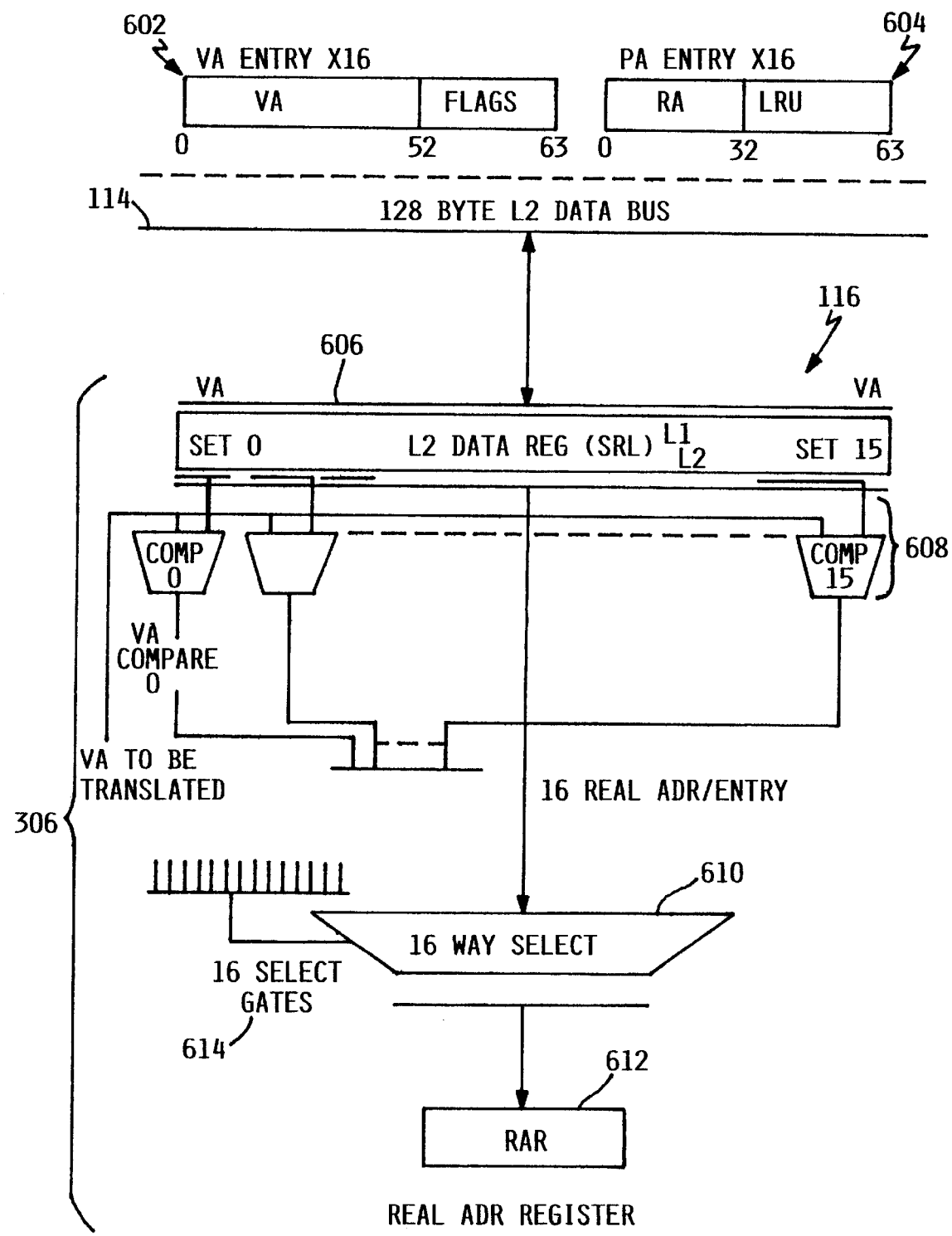
FIG. 6 is a schematic diagram of the data flow for the address translation function of the L2 cache illustrated in FIG. 5.

The data flow involved in address translation is illustrated with respect to FIG. 6, in which a representation of a virtual address (VA) entry 602 and partition address (PA) entry 604. As noted above, each associative set of the L2 cache TLB 504 comprises two rows of the array, each row having a total of 128-bytes with sixteen 8-byte entries. FIG. 6 shows the 128-byte data bus 114 to which the L2 cache is connected 116 (see also FIG. 1). FIG. 6 also shows structures that are part of the L2 cache controller 306 illustrated in FIG. 3.

In particular, FIG. 6 shows that the L2 controller 306 includes an L2 data register 606, a series of comparators 608, a 16-way select multiplexer 610, and a real address register 612. In operation, a virtual address to be translated is first transferred from the CPU 108 (FIG. 1) into the L2 data register 606 to compare the sixteen 8-byte entries against the real addresses in the L2 cache, using the comparators 608. The 16-way multiplexer 610 is used, in conjunction with select gates 614, to select from the real addresses of the L2 cache for comparison. That is, the addresses in the L2 data register 606 are compared against the real addresses in the L2 data cache, as the multiplexer moves the comparison through the stored L2 data addresses.

If none of the comparisons results in a match between the virtual address and the L2 real address, then an L2 TLB miss has occurred, and a fetch to the page frame table 120 (FIG. 1) is initiated by the CPU to find the desired data entry. If one of the virtual addresses in the L2 data register 606 matches a real address, then an L2 TLB hit has occurred, and the L2 controller causes the corresponding real address value to be fetched over the L2 data bus 114 and load the real address register 612.

Figure 7:
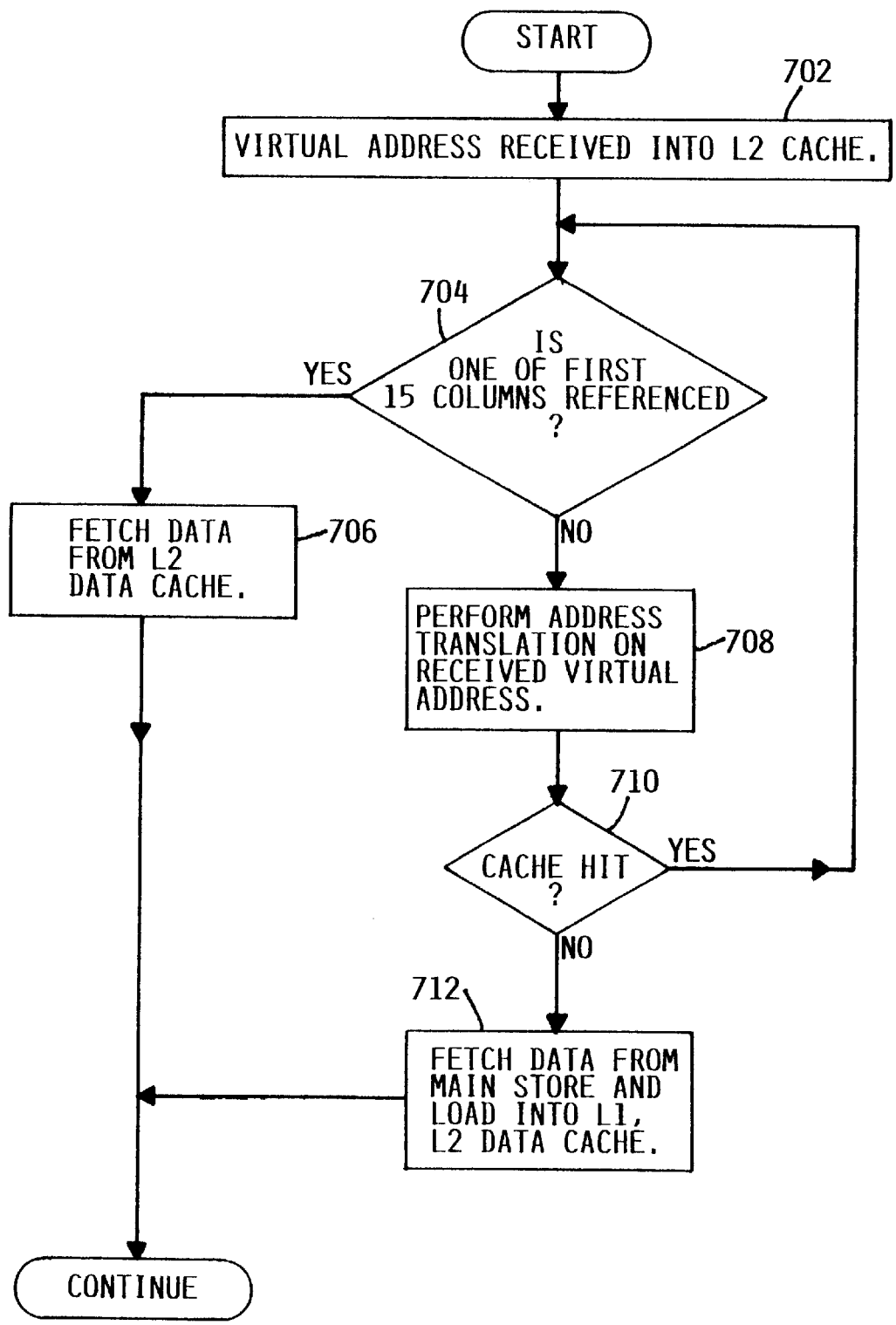
FIG. 7 is a flow diagram that shows the operation steps executed by the processor illustrated in FIG. 1, utilizing the L2 cache of FIG. 3.

This sequence of operations is illustrated in the flow diagram of FIG. 7, which shows the operational steps executed by the computer system 100 in performing the address translation function. In the preferred embodiment, the operational steps are executed by the cache controller. In the first operating step, represented by the flow diagram box numbered 702, a virtual address to be translated is received from the CPU into the L2 data register. If one of the first fifteen columns of the data cache are referenced, then a data translation has already been performed, a cache hit occurred, and the data has been found to be in the L2 data cache. That is, for the n-way configuration of the L2 cache, if one of the (n-1) associativity columns was referenced, then there was a cache hit. This situation is represented by an affirmative outcome at the decision box numbered 704. In this situation, the cache controller can proceed with fetching the data from the L2 data cache, as represented by the flow diagram box numbered 706.

If only the last column of the L2 data cache was referenced, then the data translation process will be performed to determine if the requested data item is in the cache. This situation is indicated by a negative outcome at the decision box 704. More particularly, the CPU operates such that received addresses are automatically referenced to either one of the first fifteen columns of the data cache, or to the last, sixteenth column of the cache. The CPU will automatically process a reference to the last column of the array as a TLB reference rather than as a data reference. Thus, the next step indicated in FIG. 7 is, in this instance, to perform an address translation on the received address. This is represented by the flow diagram box numbered 708. As a result of the address translation process, the received virtual address is compared with the real addresses in the L2 cache directory, using the comparators and the 16-way select multiplexer described above, to determine if there is a cache hit. This step is represented by the decision box numbered 710. If there was a cache hit, meaning a match between a virtual address and a cache real address, then processing follows the affirmative outcome of the decision box 710 to the decision box numbered 704 and then to 706, where the L2 cache controller causes the corresponding real address value to be fetched from the L2 data cache and loaded into the real address register. As noted above, the matching of the data address to be translated with the addresses stored in L2 data cache occurs with the L2 cache TLB that is formed from part of the memory array used for the L2 data cache, achieved with the specially configured L2 data cache, rather than using a separate memory array to provide the L2 cache TLB.

If there was no match between the virtual address and the L2 real address, then a cache miss is indicated and processing continues with the negative outcome of the decision box 710 to the flow diagram box numbered 712, where the cache controller must fetch data from the main store. At this step, the virtual address is used by the cache controller to fetch the appropriate page from the main store (using the PFT) and to load the appropriate data values and addresses into the various levels of cache (L1 and L2). After the data is retrieved, either because of a cache hit (box 706) or because of a cache miss (box 712), processing continues, indicated by the continuation box. In this way, the computer processor makes use of the specially configured L2 data cache described above, wherein the data cache is constructed with the physical dimensions appropriate for an n-way (for example, 16-way) data cache, but is made actually configured as an (n-1)-way (that is, 15-way) data cache, with the otherwise unused portion being configured as an L2 cache TLB.

Configurations other than those described above are possible without departing from the features of the invention. For example, the size of the L1 and L2 cache, in terms of n-way associativity, may vary from that shown and described. In any configuration that is in accordance with the present invention, the construction of the L2 cache provides a cache in which there is no separate TLB array, but which instead is contained within the data cache array. In this way, the cache can be implemented with a single chip, and can be of relatively large size, on the order of 8 MB or more.

The present invention has been described above in terms of a presently preferred embodiment so that an understanding of the present invention can be conveyed. There are, however, many configurations for computer data cache not specifically described herein but with which the present invention is applicable. The present invention should therefore not be seen as limited to the particular embodiments described herein, but rather, it should be understood that the present invention has wide applicability with respect to data cache generally. All modifications, variations, or equivalent arrangements. and implementations that are within the scope of the attached claims should therefore be considered within the scope of the invention.

I claim:

1. A storage cache comprising:
   one or more memory arrays that are of sufficient size to define an n-way associative cache and having an (n–p)-way associative data cache portion of said n-way associative cache wherein $(n-2) \geq p \geq 1$, such that p associative columns not contained in said data cache portion of the storage cache are not used as a data cache, and the p associative columns are organized as an independent m-way associative logical translation look-aside buffer (TLB) for at least some data in the data cache portion where m>p.
   a cache directory that indexes data values contained in the data cache portion; and
   a cache controller that processes references to the p associative columns not contained in said data cache portion as a TLB reference rather than a data reference to produce at least a portion of a real address output from at least a portion of a virtual address input, and thereby operates the p associative columns not contained in the data cache portion in a TLB mode rather than a data mode.

2. A storage cache as defined in claim 1, wherein the one or more memory arrays and cache directory are implemented on a single integrated circuit chip.

3. A storage cache as defined in claim 1, wherein the cache controller receives references only after a data reference to a lower-level cache has resulted in a cache miss.

4. A storage cache as defined in claim 1, wherein the TLB references relate to virtual addresses, and the cache controller responds to such TLB references by performing address translation to determine a real address corresponding to the virtual address.

5. A storage cache as defined in claim 1, wherein the cache controller operates the storage cache in a TLB mode by performing an address translation process that determines a real address and either locates data corresponding to the real address in the data cache, or fetches the data from a main memory store.

6. The storage cache of claim 1, wherein p=1.

7. A method of operating a storage cache, said storage cache having a memory array of m addressable rows and n columns, said method comprising the steps of:
   receiving a data reference to an address, said address determining an ith addressable row of said m addressable rows;
   determining if the data reference is to one of a first subset of said n columns of said memory array, said first subset having (n–p) columns, where $(n-2) \geq p \geq 1$;
   fetching data from the first subset of the ith addressable row if said determining step determines that the first subset of columns was referenced, whereby said first subset functions as an (n–p)-way associative data cache; and
   if said determining step determines that the first subset was not referenced, then making a first access to said memory array to perform an address translation process that determines at least a portion of a real address from at least a portion of a virtual address using data contained in said ith addressable row and in one of a second subset of said n columns, said second subset having p columns, said first and second subsets being disjoint, and subsequently using the at least a portion of a real address determined by performing said address translation process make a second access to said memory array to fetch data corresponding to the real address from the first subset of the said memory array.

8. A method of operating cache as defined in claim 7, wherein the step of performing an address translation process further includes storing the fetched data in one of the first subset of columns of the storage cache.

9. A method of operating cache as defined in claim 8, wherein the steps of fetching data from the first subset and performing address translation are performed on memory arrays that are located on a single circuit chip.

10. The method of operating a storage cache of claim 6, wherein p=1.

11. A computer system comprising:
    a central processor unit;
    main memory that contains a page frame table; and
    a first storage cache comprising
       one or more memory arrays that are of sufficient size to define an n-way associative cache and having an (n–p)-way associative data cache portion of said n-way associative cache wherein $(n-2) \geq p \geq 1$, such that p associative columns not contained in said data cache portion of the first storage cache are not used as a data cache, and the p associative columns are organized as an independent m-way associative logical translation look-aside buffer (TLB) for at least some data in the data cache portion, where m>p;
       a cache directory that indexes data values contained in the data cache portion; and
       a cache controller that processes references to the p associative columns not contained in said data cache portion as a TLB reference rather than a data reference to produce at least a portion of a real address output from at least a portion of a virtual address input, and thereby operates the p associated columns not contained in the data cache portion in a TLB mode rather than a data mode.

12. A computer system as defined in claim 11, wherein the one or more memory arrays and cache controller are implemented on a single integrated circuit chip.

13. A computer system as defined in claim 11, wherein the cache controller receives references only after a data reference to a lower-level cache has resulted in a cache miss.

14. A computer system as defined in claim 11, wherein the TLB references relate to virtual addresses, and the cache controller responds to such TLB references by performing address translation to determine a real address corresponding to the virtual address.

15. A computer system as defined in claim 11, wherein the cache controller operates the first storage cache in a TLB mode by performing an address translation process that determines a real address and either locates data corresponding to the real address in the data cache portion, or fetches the data from the main memory.

16. The computer system of claim 11, wherein p=1.

17. The computer system of claim 11, further comprising:

a second storage cache, said second storage cache being at a lower level than said first storage cache, said second storage cache including a translation look-aside buffer (TLB), said TLB within said second storage cache translating at least a portion of a virtual address to at least a portion of a real address, wherein at least some of the translated addresses are for data contained in said data cache portion of said first storage cache.

18. A storage cache comprising:

one or more memory arrays that are of sufficient size to define an n-way associative cache and having an (n−p)-way associative data cache portion of said n-way associative cache wherein (n−2)≧p≧1, such that p associative columns not contained in said data cache portion of the storage cache are not used as a data cache, and the p associative columns are organized as an independent m-way associative logical translation look-aside buffer (TLB) for at least some data in the data cache portion, where m>p;

a cache directory that indexes data values contained in the data cache portion; and a cache controller that processes references to the p associative columns not contained in said data cache portion as a TLB reference rather than a data reference to produce at least a portion of a real address output from at least a portion of a virtual address input, and thereby operates the p associated columns not contained in the data cache portion in a TLB mode rather than a data mode;

wherein the plurality of memory arrays and cache directory are implemented on a single integrated circuit chip, and the cache controller operates the storage cache in a TLB mode by performing an address translation process that determines a real address and either locates data corresponding to the real address in the data cache portion, or fetches the data from a main memory store.

19. A storage cache as defined in claim 18, wherein the cache controller receives references only after a data reference to a lower-level cache has resulted in a cache miss.

20. The storage cache of claim 18, wherein p=1.

* * * * *

UNITED STATES PATENT AND TRADEMARK OFFICE
CERTIFICATE OF CORRECTION

PATENT NO. : 6,349,362 B2  
DATED : February 19, 2002  
INVENTOR(S) : David Arnold Luick It is certified that error appears in the above-identified patent and that said Letters Patent is hereby corrected as shown below:

<u>Column 9,</u>
Line 34, "where m>p." should be -- where m>p, said one or more memory arrays having a common output bus for use by all n columns; --

<u>Column 10,</u>
Line 46, "where m>p;" should be -- where m>p, said one or more memory arrays having a common output bus for use by all n columns; --

<u>Column 12,</u>
Line 2, "where m>p." should be -- where m>p, said one or more memory arrays having a common output bus for use by all n columns; --

Signed and Sealed this

Eighteenth Day of June, 2002

*Attest:*

*Attesting Officer*

JAMES E. ROGAN
*Director of the United States Patent and Trademark Office*